(12) United States Patent
Saito et al.

(10) Patent No.: US 12,506,359 B2
(45) Date of Patent: Dec. 23, 2025

(54) INFORMATION PROCESSING APPARATUS FOR SMART GRID

(71) Applicant: PRIME PLANET ENERGY & SOLUTIONS, INC., Tokyo (JP)

(72) Inventors: Katsushi Saito, Nagakute (JP); Kohki Nakamura, Okazaki (JP); Hideyuki Nagai, Nagoya (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 495 days.

(21) Appl. No.: 17/932,069

(22) Filed: Sep. 14, 2022

(65) Prior Publication Data

US 2023/0096126 A1 Mar. 30, 2023

(30) Foreign Application Priority Data

Sep. 24, 2021 (JP) .................................. 2021-156182

(51) Int. Cl.
*H02J 13/00* (2006.01)
*B60L 53/66* (2019.01)
(Continued)

(52) U.S. Cl.
CPC ........ *H02J 13/00006* (2020.01); *G05B 15/02* (2013.01); *G06Q 50/06* (2013.01);
(Continued)

(58) Field of Classification Search
CPC ............ H02J 13/00006; H02J 2300/24; H02J 2310/12; H02J 2310/48; H02J 3/00;
(Continued)

(56) References Cited

U.S. PATENT DOCUMENTS 9,031,707 B2 * 5/2015 Park .................. H02J 3/38
 705/412
9,960,637 B2 * 5/2018 Sanders ............. H02J 15/00
 (Continued)

FOREIGN PATENT DOCUMENTS

JP 2013-169137 A 8/2013
JP 2014-027779 A 2/2014
(Continued)

OTHER PUBLICATIONS

Zhao, et al., "Virtual Energy Storage Sharing and Capacity Allocation," IEEE Transactions on Smart Grid, vol. 11, No. 2, Mar. 2020, pp. 1112-1123.

*Primary Examiner* — Ziaul Karim
(74) *Attorney, Agent, or Firm* — Finnegan, Henderson, Farabow, Garrett, and Dunner, LLP

(57) ABSTRACT

A smart grid information processing apparatus is applied to a smart grid including a transmission grid being connected to a plurality of electrical equipment units and a communication network transmitting information of at least an amount of electric energy transmitted through the transmission grid. The information processing apparatus is configured to execute a first recording process and a withdrawal process. The first recording process is a process of recording virtual electrical storage capacities in association with respective users, each of the virtual electrical storage capacities corresponding to an amount of electric energy in which a corresponding user is allowed to receive from the smart grid. The withdrawal process is a process of reducing the virtual electrical storage capacity of the user according to an amount of electric energy that has been received by the user from the transmission grid.

16 Claims, 8 Drawing Sheets

(51) Int. Cl.
  *G05B 15/02*  (2006.01)
  *G06Q 50/06*  (2024.01)
(52) U.S. Cl.
  CPC ......... *B60L 53/665* (2019.02); *H02J 2300/24* (2020.01); *H02J 2310/12* (2020.01); *H02J 2310/48* (2020.01)
(58) Field of Classification Search
  CPC ........ H02J 3/322; H02J 3/32; H02J 13/00004; H02J 3/381; G05B 15/02; G06Q 50/06; G06Q 10/063; G06Q 30/0201; G06Q 30/0283; G06Q 30/06; G06Q 40/04; B60L 53/665
  See application file for complete search history.

(56) References Cited

U.S. PATENT DOCUMENTS

| | | | | |
|---|---|---|---|---|
| 9,964,933 | B2* | 5/2018 | Hommelberg | G06Q 10/00 |
| 10,055,966 | B2* | 8/2018 | Foster | G06Q 10/06 |
| 11,362,516 | B2* | 6/2022 | Kitaji | H02J 13/00006 |
| 11,561,565 | B2* | 1/2023 | Forbes, Jr. | H04L 67/10 |
| 11,817,734 | B1* | 11/2023 | Zauli | H02J 7/00712 |
| 11,955,799 | B2* | 4/2024 | Yamada | H02J 3/144 |
| 2011/0115223 | A1* | 5/2011 | Stahlkopf | H02P 9/04 |
| | | | | 290/7 |
| 2011/0258112 | A1* | 10/2011 | Eder | B60L 53/65 |
| | | | | 320/109 |
| 2011/0295440 | A1* | 12/2011 | Noma | H04W 24/00 |
| | | | | 700/297 |
| 2011/0302078 | A1* | 12/2011 | Failing | B60L 53/126 |
| | | | | 700/297 |
| 2012/0016528 | A1* | 1/2012 | Raman | G06F 9/5094 |
| | | | | 709/219 |
| 2012/0150361 | A1* | 6/2012 | Lazaris | H02J 3/466 |
| | | | | 700/297 |
| 2012/0166008 | A1* | 6/2012 | Jeong | H02J 13/00001 |
| | | | | 700/295 |
| 2012/0166115 | A1* | 6/2012 | Apostolakis | G06Q 50/06 |
| | | | | 702/62 |
| 2012/0223840 | A1* | 9/2012 | Guymon | H04B 3/54 |
| | | | | 340/870.02 |
| 2013/0213038 | A1* | 8/2013 | Lazaris | G06Q 30/0605 |
| | | | | 60/641.1 |
| 2014/0303795 | A1* | 10/2014 | Hommelberg | G06Q 10/00 |
| | | | | 700/286 |
| 2014/0316600 | A1* | 10/2014 | Jammer | H02J 3/322 |
| | | | | 700/297 |
| 2015/0207323 | A1* | 7/2015 | Baba | H02J 3/06 |
| | | | | 307/20 |
| 2016/0193931 | A1* | 7/2016 | Adachi | B60L 53/14 |
| | | | | 307/10.1 |
| 2017/0005515 | A1* | 1/2017 | Sanders | H02J 3/388 |
| 2017/0132902 | A1* | 5/2017 | Foster | G01R 21/1333 |
| 2017/0141368 | A1* | 5/2017 | Ricci | B60L 53/52 |
| 2018/0041037 | A1* | 2/2018 | Hidaka | H02J 3/32 |
| 2019/0181642 | A1* | 6/2019 | Cowen, III | G05B 13/042 |
| 2020/0220381 | A1* | 7/2020 | Lee | H02J 13/00002 |
| 2021/0234372 | A1* | 7/2021 | Inoue | H02J 3/004 |

FOREIGN PATENT DOCUMENTS

| | | |
|---|---|---|
| JP | 2014-50233 A | 3/2014 |
| JP | 2015-35848 A | 2/2015 |
| JP | 2016-063548 A | 4/2016 |
| JP | 2019-92386 A | 6/2019 |
| JP | 2020-170418 A | 10/2020 |
| JP | 2021-036762 A | 3/2021 |
| WO | WO 2016/136263 A1 | 9/2016 |

* cited by examiner

| Power Generation Device | Power Generation Device ID | User ID |
|---|---|---|
| · · · · · · | · · · · · · | · · · · · · |
| · · · · · · | · · · · · · | · · · · · · |
| Power Generation Device 51 | · · · · 5 1 | A 1 · · · · |
| Power Generation Device 52 | · · · · 5 2 | A 2 · · · · |
| Power Generation Device 53 | · · · · 5 3 | A 3 · · · · |
| Power Generation Device 54 | · · · · 5 4 | A 4 · · · · |
| Power Generation Device 55 | · · · · 5 5 | A 5 · · · · |
| · · · · · · | · · · · · · | · · · · · · |
| · · · · · · | · · · · · · | · · · · · · |

FIG.4

| Electricity Storage Device /Electric Vehicle | Electricity Storage Device ID | Electric Vehicle ID | User ID |
|---|---|---|---|
| · · · · · · | · · · · · · | — | · · · · · · |
| · · · · · · | · · · · · · | — | · · · · · · |
| Electricity Storage Device 61 | · · · · 6 1 | — | A 1 · · · · |
| Electricity Storage Device 62 | · · · · 6 2 | — | A 2 · · · · |
| Electricity Storage Device 63 | · · · · 6 3 | — | A 3 · · · · |
| Electricity Storage Device 64 | · · · · 6 4 | — | A 4 · · · · |
| Electricity Storage Device 65 | · · · · 6 5 | — | A 5 · · · · |
| · · · · · · | · · · · · · | — | · · · · · · |
| · · · · · · | · · · · · · | — | · · · · · · |
| · · · · · · | · · · · · · | — | · · · · · · |
| · · · · · · | · · · · · · | — | · · · · · · |
| Electric Vehicle 71 | · · · · 7 1 | · · · · 7 1 | A 1 · · · · |
| Electric Vehicle 72 | · · · · 7 2 | · · · · 7 2 | A 2 · · · · |
| Electric Vehicle 73 | · · · · · · | · · · · · · | · · · · · · |
| · · · · · · | · · · · · · | · · · · · · | · · · · · · |
| · · · · · · | · · · · · · | · · · · · · | · · · · · · |

FIG.5

| User ID | Virtual Electrical Storage Capacity (Weekday: 8:00-18:00) | Virtual Electrical Storage Capacity (Weekday: 18:00 - Next day 8:00) | Virtual Electrical Storage Capacity (Weekend: 8:00-18:00) | Virtual Electrical Storage Capacity (Weekend: 18:00 - Next day 8:00) | Electrical Storage Capacity | Monetary Balance | Point Balance |
|---|---|---|---|---|---|---|---|
| ... | ... | ... | ... | ... | ... | ... | ... |
| A1 | ... | ... | ... | ... | ... | ... | ... |
| A2 | ... | ... | ... | ... | ... | ... | ... |
| A3 | ... | ... | ... | ... | ... | ... | ... |
| A4 | ... | ... | ... | ... | ... | ... | ... |
| A5 | ... | ... | ... | ... | ... | ... | ... |
| ... | ... | ... | ... | ... | ... | ... | ... | m8, m9

FIG.8

INFORMATION PROCESSING APPARATUS FOR SMART GRID

CROSS REFERENCE TO RELATED APPLICATIONS

The present application claims priority from Japanese Patent Application No. 2021-156182 filed on Sep. 24, 2021, which is incorporated by reference herein in its entirety.

BACKGROUND

The present invention relates to an information processing apparatus for a smart grid.

JP 2015-035848 A discloses the technical problem of enabling discharging electric power of a battery mounted on an electric vehicle to a power line correspondingly to the amount of electric energy used by a consumer even when the electric vehicle is distant from the consumer. The electric power supply system disclosed in the publication includes a measuring device, a discharge device, and a controller. The measuring device measures the amount of electric energy that a consumer receives from a power utility grid. The discharge device supplies electric power to a power line from a driving battery mounted on an electric vehicle. The controller controls the discharge device so as to adjust the amount of electric energy supplied from the battery to the power line. The controller includes a communication section and an adjusting section. The communication section acquires the amount of electric energy measured by the measuring device by communicating with the measuring device. The adjusting section adjusts the amount of electric energy to be supplied from the battery to the power line so as to be at least a portion of the amount of electric energy measured by the measuring device.

JP 2019-092386 A discloses an electric power control system that allows a consumer to install a stationary storage battery easily. This system includes a storage battery that is capable of allocating a predetermined electricity storage capacity to the consumer, and an electric power control unit including a controller that controls charging and discharging of the storage battery. The controller controls charging and discharging of a storage battery of which the amount of charging and discharging according to a charge/discharge instruction is allocated to a consumer, when acquiring the charge/discharge instruction to the storage battery from the consumer. Upon acquiring the charge/discharge instruction to the storage battery from the consumer, the controller accepts the charge/discharge instruction if the amount of charging and discharging according to the charge/discharge instruction is within the range of the electricity storage capacity allocated to the consumer. On the other hand, if the amount of charging and discharging according to the charge/discharge instruction is outside the range of the electricity storage capacity allocated to the consumer, the controller accepts the charge/discharge instruction, reduces the electricity storage capacity corresponding to the amount of charging and discharging that exceeds the range of the electricity storage capacity allocated to the consumer from the electricity storage capacity that is not allocated to any consumer, and allocates the deducted electricity storage capacity to the consumer.

SUMMARY

It is an intention of the present inventors to accomplish an electricity trade with a higher degree of freedom and to improve user convenience in using electric power.

According to the present disclosure, a smart grid information processing apparatus is applied to a smart grid including a transmission grid being connected to a plurality of electrical power devices and a communication network transmitting at least information of an amount of electric energy transmitted through the transmission grid. The information processing apparatus is configured to execute a first recording process and a withdrawal process. The first recording process is a process of recording virtual electrical storage capacities in association with respective users, each of the virtual electrical storage capacities corresponding to an amount of electric energy in which a corresponding user is allowed to receive from the smart grid. The withdrawal process is a process of reducing the virtual electrical storage capacity of the corresponding user according to an amount of electric energy that has been received by the user from the transmission grid.

The information processing apparatus as described above is able to set a virtual electrical storage capacity corresponding to the amount of electric energy in which a user is allowed to receive from the smart grid, to improve user convenience in utilizing electric power.

The first recording process may record a virtual electrical storage capacity for each of restrictive conditions under which a user is allowed to receive electric power from the smart grid. The virtual electrical storage capacity may be provided with a restrictive condition that restricts a time period in which the user is allowed to receive electric power from the smart grid depending on at least one of time slot, time and date, and a day of the week.

The withdrawal process may be configured to reduce the virtual electrical storage capacity by increasing or decreasing a predetermined proportion of the amount of electric energy that has been received by the user from the transmission grid. The withdrawal process may be configured to further reduce the virtual electrical storage capacity by a corresponding amount to a predetermined commission fee.

The information processing apparatus may be further configured to execute a depositing process of increasing the virtual electrical storage capacity of the user according to an amount of electric energy that has been output to the transmission grid from an electrical equipment unit associated with the corresponding user.

The depositing process may be configured to increase the virtual electrical storage capacity by increasing or decreasing a predetermined proportion of the amount of electric energy that has been output to the transmission grid from the electrical equipment unit associated with the user. The depositing process may also be configured to deduct an amount corresponding to a predetermined commission fee from the virtual electrical storage capacity.

The information processing apparatus may be further configured to execute a transferring process of transferring the virtual electrical storage capacity between users. The information processing apparatus may be further configured to execute a purchasing process of purchasing the virtual electrical storage capacity of the user. The information processing apparatus may be further configured to execute a selling process of selling the virtual electrical storage capacity of the user. The information processing apparatus may be further configured to execute a price setting process of setting a price per unit of the virtual electrical storage capacity.

The information processing apparatus may be further configured to execute an exchange process of exchanging the virtual electrical storage capacity for a predetermined commercially usable point. In this case, the information processing apparatus may be further configured to execute an exchange setting process of setting a number of points to be exchanged per unit of the virtual electrical storage capacity.

The information processing apparatus may be further configured to execute a capacity-data transmission process of transmitting the virtual electrical storage capacity of the user to a predetermined terminal of the user.

The smart grid may be connected to at least one electricity storage device, and the information processing apparatus may be further configured to execute a second recording process of recording, of an electricity storage capacity of the electricity storage device connected to the smart grid, an allocated capacity allocated to the user in association with the user. The smart grid may be connected to at least one electricity storage device, and the information processing apparatus may be further configured to execute a process of setting a portion of an electricity storage capacity of the electricity storage device connected to the smart grid to be available for sharing with the user connected to the smart grid.

BRIEF DESCRIPTION OF DRAWINGS

FIG. 4 is a table illustrating an example of the configuration of a memory storage unit that stores information indicative of power generation devices 51 to 55 in association with users.

FIG. 5 is a table illustrating an example of the configuration of a memory storage unit that stores electricity storage devices 61 to 65 in association with users.

FIG. 8 is a schematic view illustrating another embodiment of a table that is recorded in a first recording process m1.

DESCRIPTION OF EMBODIMENTS

Embodiments of the present disclosure will be described hereinbelow. It should be noted, however, that the embodiments illustrated herein are, of course, not intended to limit the disclosure. The present disclosure is not limited to the following embodiments described herein unless specifically stated otherwise. The drawings are depicted schematically and do not necessarily accurately depict actual objects. The features and components that exhibit the same effects are designated by the same reference symbols as appropriate, and the description thereof will not be repeated.
Smart Grid 10

Figure 1:
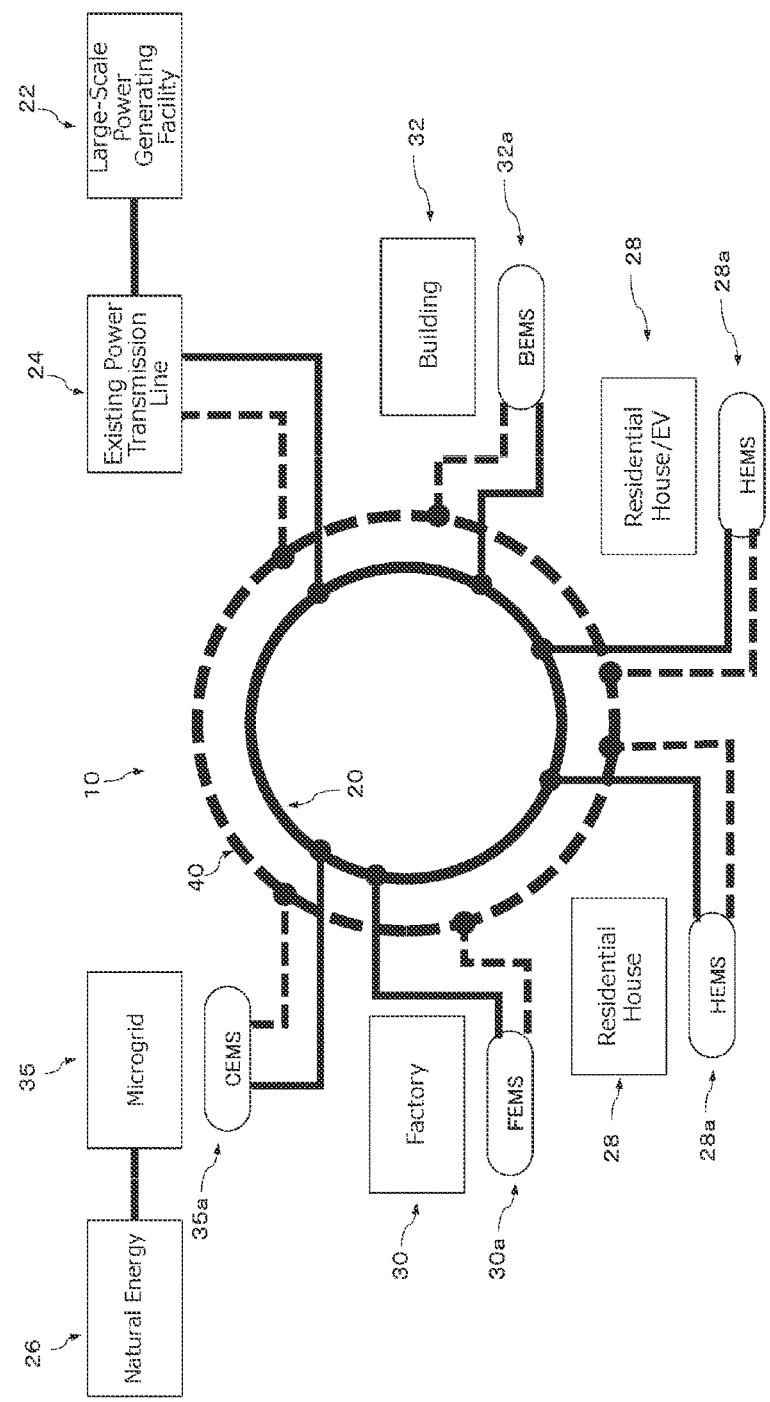
FIG. 1 is a schematic view illustrating a smart grid 10.

FIG. 1 is a schematic view illustrating a smart grid 10. As illustrated in FIG. 1, the smart grid 10 includes a transmission grid 20 and a communication network 40. A plurality of electrical equipment units are connected to the transmission grid 20 of the smart grid 10. Herein, the term "electrical equipment unit" collectively refers to various types of equipment that are necessary to use electricity. The electrical equipment units may include various types of equipment that are used for electric power generation, conversion of electric energy into another form of energy, electricity storage, voltage conversion and power factor regulation, connection and disconnection of electric power, and the like. The transmission grid 20 of the smart grid 10 is connected to various types of electrical equipment units, including: existing power transmission lines 24 for transmitting electric power from a large-scale power generating facility 22, such as a thermal power plant, a hydroelectric power plant, and a nuclear power plant, that is operated by a power utility company; a power generation operator 26 that uses natural energy, such as solar power generation and wind power generation; a residential house 28 installed with a solar power system or a cogeneration power generation system; a factory operator 30 installed with a solar power system on a factory; and a building operator 32 installed with a solar power system on a building. The transmission grid 20 may also be connected to electric vehicles equipped with on-board batteries. Each of small-scale independent regional grids that include a solar power generation plant and a wind power generation plant may be considered as a small-sized electric power distribution grid, which is referred to as a microgrid 35. Each of these electricity consumers and power generation operators connected to the transmission grid 20 of the smart grid 10 is connected to a communication network 40 so that data of the electric power transmission and distribution can be bidirectionally communicated with each other and can be managed.

Herein, electric vehicles that are connectable to the transmission grid 20 include various types of electric vehicles that are connected to the transmission grid 20 and are capable of charging and discharging, such as plug-in hybrid electric vehicles (PHEVs), plug-in range extender electric vehicles (RexEVs), fuel cell electric vehicles (FCEVs), and battery electric vehicles (BEVs). The electric vehicles may also include hybrid electric vehicles (HEVs), and range extender electric vehicles, each provided with the function to be connected to the transmission grid 20 and supply electric power generated by the vehicles to the transmission grid 20. The hybrid electric vehicles and the range extender type electric vehicles may include not only ones that generate electric power using gasoline or diesel fuel but also ones that generate electric power with a hydrogen engine.

The electricity consumers are those who consume electric power, such as households and factories. The electricity consumers receive supply of electricity while purchasing electricity when appropriate. The power generation operators that make use of natural energy such as solar power generation and wind power generation sell the generated electric power. The business operators installed with a solar power generation equipment on their own factories or buildings, the electricity consumers that perform home power generation, and the like sell electricity when surplus electric power arises in the solar power generation equipment and purchase the electric power that cannot be covered by the solar power generation equipment.

Among them, a management system 28a within a household is referred to as a home energy management system (HEMS). A management system 30a within a factory is referred to as a factory energy management system (FEMS). A management system 32a within a building is referred to as a building energy management system (BEMS). An energy management system 35a of the microgrid 35 that manages the electric power demand in a region and the amount of electric power supply supplied by regional power plants such as solar power generation plants, wind power generation plants, and biomass power generation plants is referred to as cluster/community energy management system (CEMS). CEMS is a vital system of the smart grid, which manages the overall energy of the region including HEMS, BEMS, and FEMS. The smart grid 10 is installed with an information processing apparatus 100 that collects information from these elements. The smart grid 10 is configured to be able to control and optimize the flow of electric power in the transmission grid 20 from both supply side and demand side by utilizing information technology through the communication network 40.

Figure 2:
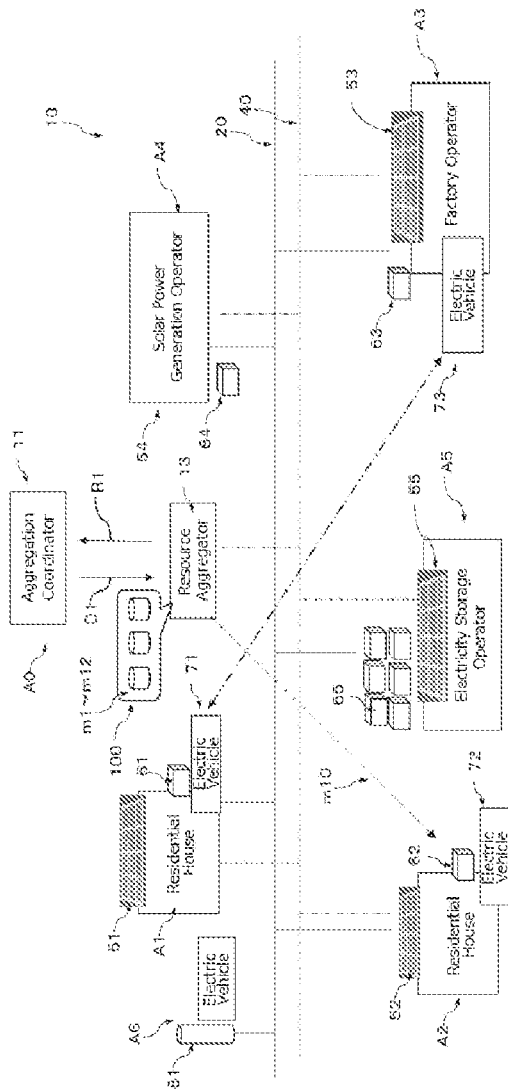
FIG. 2 is a schematic view of an information processing apparatus 100 for the smart grid 10.

FIG. 2 is a schematic view of the information processing apparatus 100 for the smart grid 10. The smart grid 10 may include, as illustrated in FIG. 2, an aggregation coordinator 11 and a resource aggregator 13. The aggregation coordinator 11 is a business operator that aggregates the amount of electric power controlled by the resource aggregator 13 and engages in electric power transactions with general transmission-and-distribution operators and retail electric providers. The aggregation coordinator 11 is served by, for example, a power utility company. The resource aggregator 13 is generally a business operator that directly makes VPP service agreements with consumers of electric power to control the resources.

As illustrated in FIG. 2, the aggregation coordinator 11 requests the resource aggregator 13 to perform control for adjusting demand according to demand response (D1). The resource aggregator 13 responds to such a control request according to the agreement with the aggregation coordinator 11 (R1). The adjustments that are required of the resource aggregator 13 are two types, "downward DR" in which electric power demand is reduced (i.e., suppressed) and "upward DR" in which electric power demand is increased (i.e., created). In the downward DR, for example, the HEMS, the BEMS, and the FEMS (see FIG. 1) are controlled to reduce the electric power consumption. In cases where there are electricity storage devices and electric vehicles that are connected to the transmission grid 20 so as to be able to output electric power thereto, the downward DR may be performed to control the electricity storage devices and the electric vehicles to supply the electric power stored in the electricity storage devices and the electric vehicles to the transmission grid 20. In the upward DR, for example, the HEMS, the BEMS, and the FEMS are controlled to increase the electric power consumption. For example, the BEMS may be effected to cancel the control for lowering the temperature setting of the air conditioning. It is also possible that the FEMS may be used to increase the utilization rate of the factories. In cases where there are electricity storage devices and electric vehicles that are connected to the transmission grid 20 so as to be able to output electric power thereto, the upward DR may be performed to control the electricity storage devices and the on-board batteries of the electric vehicles to actively store electric power in the electricity storage devices and the electric vehicles.

Currently, interchange of electric power is processed each time with sales of electricity and purchases of electricity. The electric power supplied to the transmission grid 20 is the one that is sold, while the electric power received from the transmission grid 20 is the one that is purchased. In the case of, for example, the residential house equipped with solar power generation equipment and an electricity storage device, electricity is sold each time when there is surplus electric power in the solar power generation equipment such as to exceed the electricity storage capability of the electricity storage device. During night time or when weather is poor, for example, there may be cases where sufficient electric power is not stored in the electricity storage device or the output capacity of the electricity storage device is limited so that the output power from the electricity storage device alone is insufficient to supply the power consumption of the household. In such cases, the user needs to purchase the shortfall amount of electric power each time. However, if it is possible to use the electric power generated by the solar power generation equipment installed in the residential house all the time, the solar power generation equipment may be able to supply all the electric power consumed by the household, or it may be possible to reduce the amount of electric power that needs to be purchased. In addition, the sales of electricity is the act in which electric power is exchanged into money, whereas the purchase of electricity is the act in which electric power is bought with money. Because these acts involve money, a monetary loss may arise due to the difference between the electricity sales price and the electricity purchase price. The present inventors intend to construct a system that allows users to feel that they have consumed the maximum amount of electric power generated at their own houses even in such cases.

The information processing apparatus 100 of the smart grid 10 proposed herein is, as illustrated in FIG. 2, connected to the communication network 40 of the smart grid 10. The smart grid 10 includes a transmission grid 20 connected to a plurality of power generation devices 51 to 55 and a plurality of electricity storage devices 61 to 65, and a communication network 40 transmitting at least the information on the amount of electric energy transmitted through the transmission grid 20.

In the example shown in FIG. 2, the power generation devices 51 to 55 may include various types of power generation devices, such as a solar power generation device, a cogeneration power generation device, a wind power generation device, and a biomass power generation device. The power generation devices 51 to 55 may also include home-use power generation devices and large-scale power generation devices, for example.

The electricity storage devices 61 to 65 may include various types of electricity storage devices, such as stationary-type electricity storage devices and on-board batteries of electric vehicles that are connectable to the smart grid 10. The stationary-type electricity storage devices may also include home-use stationary-type electricity storage devices and large-scale electricity storage devices, for example.

In the example shown in FIG. 2, the electricity storage devices 61 and 62 are home-use stationary-type electricity storage devices installed in residential houses A1 and A2. The residential houses A1 and A2 are provided with charging and discharging stations to which electric vehicles 71 and 72 can be connected when appropriate. Each of the electric vehicles 71 and 72 includes an on-board battery that is capable of being charged and discharged through the charging and discharging stations. Thus, each of the electric vehicles 71 and 72 functions as an electricity storage device as appropriate. In addition, solar panels serving as the power generation devices 51 and 52 are installed on the rooftops of the residential houses A1 and A2. The residential houses A1 and A2 may be stand-alone houses, or multi-family residential houses, such as condominiums and apartment houses.

A factory A3 is equipped with a power generation device 52 that utilizes renewable energy, such as a solar panel, and a stationary-type electricity storage device 63. In the example shown in FIG. 2, the factory A3 is provided with a charging station. For example, an electric vehicle 73 of an employee who commutes by electric vehicle is connected to the charging station. Here, during work hours, the employee's electric vehicle 73 is connected to the smart grid 10 via the charging station in the factory A3. During home hours, the employee's electric vehicle 73 is connected to the smart grid 10 via a charging station installed in his/her residential house.

For example, the resident of a residential house A1 may be an employee of the factory A3. In this case, it is possible that the resident of the residential house A1 commutes to the factory A3 by an electric vehicle 71. The electric vehicle 71 may be connected to the smart grid 10 at the residential house A1 and at the factory A3 as appropriate. For this reason, even on weekdays, the electric vehicle 71 is connected to the smart grid 10 most of the time during the time slot in which it is parked. The electric vehicles 71 to 73 may be connected to the smart grid 10 via a charging station 81 of charging spots A6 that are provided not only at residential houses and the workplaces but also at commercial facilities, tourist spots, and regional areas. Also, the charging spot A6 and the electric vehicles 71 to 73 may be configured to have a function of controlling charging from the smart grid 10 and discharging to the smart grid 10 appropriately. The charging from the smart grid 10 and the discharging to the smart grid 10 may be controlled by, for example, the resource aggregator 13.

A power generation operator A4 is equipped with a power generation device 54 installed with a large number of solar panels. The power generation operator A4 allows the electric power generated by the solar panels to be discharged to the smart grid 10. The power generation device of the power generation operator A4 is not limited to the solar power generation device but may be various types of power generation devices, such as wind power generation devices, biomass power generation devices, and small-sized hydroelectric power generation devices. The power generation operator A4 may be provided with an appropriate stationary-type electricity storage device 64. An electricity storage operator A5 is a business operator that prepares a large-scale electricity storage equipment 65 installed with a large number of electricity storage devices. In the embodiment shown in FIG. 2, the facility of the electricity storage operator A5 is also provided with a power generation device 55 such as solar panels. The large-scale electricity storage equipment 65 prepared by the electricity storage operator A5 may be, for example, a stationary-type storage battery in which recycled products of on-board vehicle batteries, off-specification products from battery manufacturers, and the like are combined. Such a stationary-type storage battery is considered to be able to construct a high-capacity and stable storage battery at relatively low cost.

The higher the total capacity of all the electrical storage devices connected to the smart grid 10 is, the higher the degree of flexibility in electricity storage. The total capacity of all the electrical storage devices connected to the smart grid 10 may be, for example, higher than or equal to an electricity storage capacity corresponding to the electric power required by the microgrid in half a day, more preferably higher than or equal to an electricity storage capacity required in two or three days, and still more preferably higher than or equal to an electricity storage capacity required in a week. Moreover, all the electrical storage devices may desirably be charged sufficiently. Furthermore, all the electrical storage devices connected to the smart grid 10 as a whole may have a sufficient available capacity relative to the amount of power that can be generated within the region of the microgrid. This increases the degree of flexibility in electricity storage and power transfer in the smart grid 10 and thereby improves user convenience. The smart grid 10 managed by the information processing apparatus 100 disclosed herein allows, for example, an electricity storage operator A5 as illustrated in FIG. 2 that has an electricity storage device provided with a large-scale electricity storage capability and operates an electricity storage service through the smart grid 10 as their main service to be viable.

Information Processing Apparatus 100

The information processing apparatus 100 for the smart grid 10 is an apparatus that processes information of the smart grid 10. The information processing apparatus 100 may be implemented by, for example, a computer that executes predetermined processes according to an embedded program. In the embodiment shown in FIG. 2, the information processing apparatus 100 is incorporated in a cloud server of the resource aggregator 13 connected to the communication network 40 of the smart grid 10 as one of its functions. Each of various processes executed by the information processing apparatus 100 may be implemented as a processing module that executes predetermined operational processes according to a predetermined program.

In addition to being used for self-consumption, the electric power generated by the power generation devices 51 to 55 connected to the smart grid 10 is stored in their own storage batteries and their own electric vehicles. When surplus electric power arises, the surplus electric power is supplied to the smart grid 10. The information processing apparatus 100 may be configured to execute an electricity selling process each time when this occurs. When a shortfall of electric power occurs, the electric power surplus electric power is supplied to the smart grid 10. The information processing apparatus 100 may be configured to execute an electricity purchasing process each time when this occurs.

For example, the user of the residential house A1 may store the electric power generated by the user's own power generation device 51 into an electricity storage device 61. It is also possible to supply the electric power generated by the user's own power generation device 51 to the smart grid 10. Each time when electric power is supplied to the smart grid 10, the electric power is sold to an electric power utility operator. The electric power supplied to the smart grid 10 is consumed through the smart grid 10 by a consumer connected to the smart grid 10. Each time when the consumer receives electric power from the smart grid 10, the consumer purchases electricity from the electric power utility operator.

On the other hand, the smart grid 10 is connected to the plurality of electricity storage devices 61 to 65. The plurality of electricity storage devices 61 to 65 may be configured so that the charging and discharging can be controlled, for example, according to an instruction from the resource aggregator 13. The present inventors believe that, in this type of smart grid 10, the user of the residential house A1 is able to store surplus electric power that occurs at the user's own house through the smart grid 10. For example, the surplus electric power of the user of the residential house A1 may be controlled so that the surplus electric power of the smart grid 10 can be stored through the smart grid 10 into the plurality of electricity storage devices 61 to 65 connected to the smart grid 10. In this case, when the electric power generated by the user's own power generation device 51 of the user of the residential house A1 is supplied to the smart grid 10, it is also possible to store the electric power into the plurality of electricity storage devices 61 to 65 connected to the smart grid 10 through the control by the resource aggregator 13.

This allows the user of the residential house A1 to store the electric power into the plurality of electricity storage devices 61 to 65 connected to the smart grid 10 when the electric power generated by the user's own power generation device 51 is supplied to the smart grid 10. Through the smart grid 10, the user can receive the electric power stored in the plurality of electricity storage devices 61 to 65 connected to the smart grid 10 at any time the user wishes. Such a control is made possible by the smart grid 10, which includes the transmission grid 20 and the communication network 40 and is controlled by information technology. In this case, the user is allowed to choose to store the surplus electric power into the smart grid 10 each time instead of being processed as a sale of electricity.

From such a viewpoint, the present inventors have conceived that the information processing apparatus 100 for the smart grid 10 is allowed to store a virtual electrical storage capacity that is defined as an amount of electric energy corresponding to the amount of electric energy in which a user is allowed to receive electric power from the smart grid 10, in association with the user. This allows the electric power discharged from the user to the smart grid 10 to be recorded as the electric power that is stored in the smart grid 10 or as the electric power that the user is allowed to receive from the smart grid 10. This means that the user is able to store surplus electric power through the smart grid 10. The stored electric power is recorded as a virtual electrical storage capacity corresponding to the amount of electric energy that the user is allowed to receive from the smart grid 10. Thus, by recording the virtual electrical storage capacity in association with the user in the information processing apparatus 100 for the smart grid 10, the information processing apparatus 100 is able to control the smart grid 10 so that the user can receive the corresponding amount of electric power according to the virtual electrical storage capacity stored in association with the user. This enables the user to store the electric power generated at the users own house through the smart grid 10 and to use the stored electric power at any time, so that the user does not need to sell electricity each time.

Processes m1 to m12 Executed by Information Processing Apparatus 100

In this embodiment, the processes executed by the information processing apparatus 100 include a first recording process m1, a depositing process m2, a withdrawal process m3, a transferring process m4, a purchasing process m5, a selling process m6, a price setting process m7, an exchange process m8, an exchange setting process m9, a capacity-data transmission process m10, a second recording process m11, and a sharing setting process m12. Each of the processes m1 to m12 is implemented by a process according to a program embedded in the information processing apparatus 100. It is to be understood that this description merely illustrates examples of the processes executed by the information processing apparatus 100, and that the processes executed by the information processing apparatus 100 are not limited to the examples illustrated herein.

First Recording Process m1

The first recording process m1 is a process of recording virtual electrical storage capacities in association with respective users, each virtual electrical storage capacity corresponding to the amount of electric energy in which a corresponding user is allowed to receive from the smart grid 10. The virtual electrical storage capacity is a datum that can be handled by the information processing apparatus 100. The virtual electrical storage capacity is the amount of electric energy corresponding to the amount of electric energy in which a user is allowed to receive from the smart grid 10, which is recorded in the information processing apparatus 100 in association with the user. The virtual electrical storage capacity may also be considered as the right to receive the corresponding amount of electric energy from the smart grid 10. The virtual electrical storage capacity may also be considered as the amount of electric energy that the user has stored in the smart grid 10. The virtual electrical storage capacity may be considered as the amount of electric energy that the user has stored in the smart grid 10 and also considered as the right to receive the corresponding amount of electric energy through the smart grid 10. Note that it does not matter whether the amount of electric energy that is actually stored by the user through the smart grid 10 into the electricity storage devices 61 to 65 connected to the smart grid 10 matches the virtual electrical storage capacity that is recorded in the information processing apparatus 100 as information.

Figure 3:
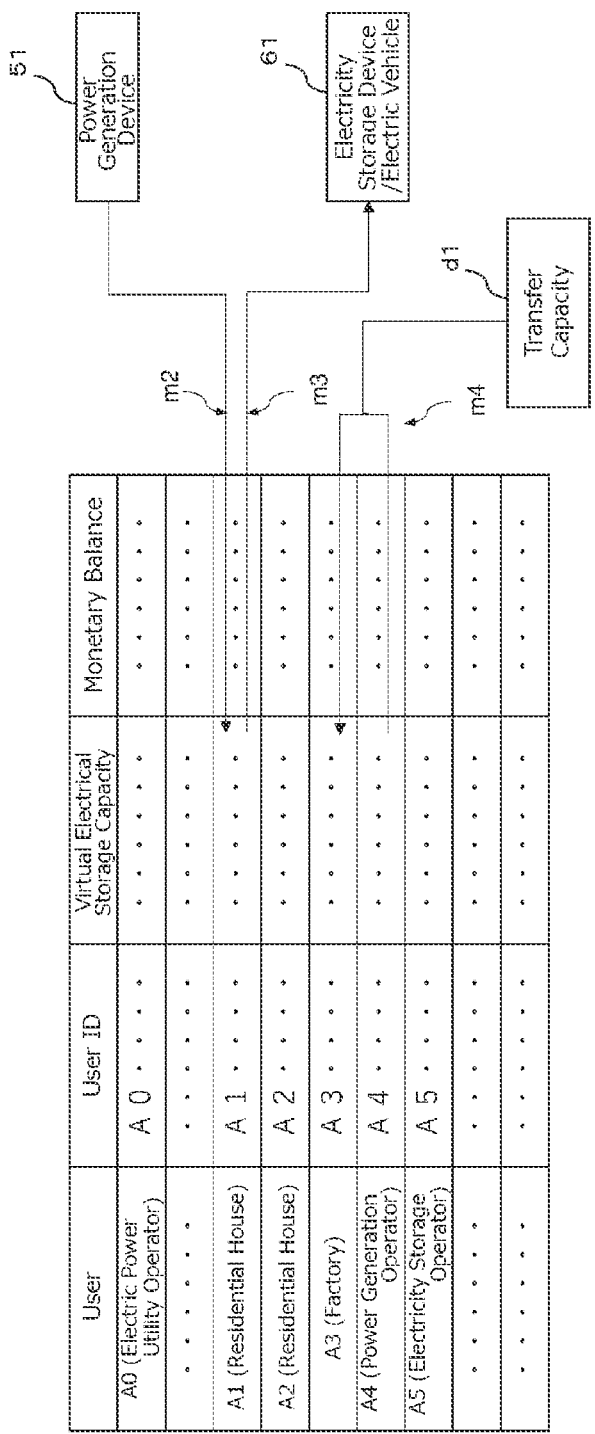
FIG. 3 is a configuration diagram illustrating an example of the configuration of a memory storage unit that stores virtual electrical storage capacities in association with users.

The information processing apparatus 100 may include a memory storage unit that stores virtual electrical storage capacities in association with users. Each of the users may be assigned an ID for identifying the user. Since the virtual electrical storage capacities are stored in association with the respective users in the information processing apparatus 100, the information processing apparatus 100 can handle each of the virtual electrical storage capacities as the amount of electric energy that a user can freely dispose of. In other words, in reality, the virtual electrical storage capacities may be data that can be handled by a computer. FIG. 3 is a configuration diagram illustrating an example of the configuration of the memory storage unit that stores virtual electrical storage capacities in association with users. As illustrated in FIG. 3, in the information processing apparatus 100, user IDs and virtual electrical storage capacities may be recorded in a table that can record the user IDs and the virtual electrical storage capacities side by side. The virtual electrical storage capacities may be denoted in a unit that is used for amount of electric energy so that they can be handled in the same way as is the amount of electric energy.

Also in this embodiment, as illustrated in FIG. 3, the information processing apparatus 100 is configured to be able to record monetary balances in association with user IDs. For the monetary balances, for example, it is possible to use a similar system to mobile payments, and the monetary balances may be linked to various payments, such as a bank account payment (immediate payment), a credit card payment (post payment), a charge payment (pre-payment), and a point payment, which are used for mobile payments. For example, in the case of bank account payment (immediate payment), the amount used is instantly debited from a predetermined bank account of the user according to the amount charged to the monetary balance. In the case of credit card payment (post payment), a credit card used by the user is preregistered, and a payment is made by the credit card according to the amount charged to the monetary balance. In the case of charge payment (pre-payment), cash can be used at a terminal or a checkout for charging, and it is also possible that a certain amount may be charged by a credit card or from a bank account. In the case of point payment, the points awarded according to the use and purchase of goods and services may be exchanged to a monetary balance so that the monetary balance can be used for payment for the price of the service that utilizes the virtual electrical storage capacity provided here. It is also possible to use the awarded points as they are for the payment for the price of the service that utilizes the virtual electrical storage capacity provided here.

Specifically, in the embodiment shown in FIG. 2, the residential house A1 can contribute to the adjustment of demand and supply of electricity in the smart grid 10 by means of power generation by the solar panels as the power generation device 51, electricity storage in the electric vehicle 71, and discharging of electric power from the electric vehicle 71 to the smart grid 10. The resident of the residential house A1 may become a user of the smart grid 10 based on a predetermined contract agreement. The electric power generated by the solar panels as the power generation device 51 is used as the electric power to be used in the residential house A1, and moreover, a surplus of the electric power is supplied to the smart grid 10. In this case, if the smart grid 10 has a surplus electric power, the surplus electric power may be charged into the electricity storage devices 61 to 65 connected to the smart grid 10 in the adjustment of demand response (DR). In this embodiment, the information processing apparatus 100 deals with the surplus electric power supplied from the residential house A1 as the one that is stored in the electricity storage devices 61 to 65 connected to the smart grid 10, not as the one that has been sold. In this case, the information processing apparatus 100 measures the amount of electric energy corresponding to the surplus electric power supplied from the residential house A1 to the smart grid 10 as a virtual electrical storage capacity. The virtual electrical storage capacity measured here is associated with the resident of the residential house A1 as the user. The amount of electric energy corresponding to the surplus electric power supplied from the residential house A1 to the smart grid 10 may be measured by a smart meter installed to the residential house A1.

Power Generation Device ID

The information processing apparatus 100 may include a memory storage unit that stores information indicative of the power generation devices 51 to 55 connected to the smart grid 10 in association with the users. FIG. 4 is a table illustrating an example of the configuration of the memory storage unit that stores information indicative of the power generation devices 51 to 55 in association with the users. In this embodiment, the power generation devices 51 to 55 are assigned respective power generation device IDs as their identification numbers. As illustrated in FIG. 4, the power generation device IDs and the user IDs may be recorded in a table that can record the power generation device IDs and the user IDs side by side. For example, when the present system that uses virtual electrical storage capacities is used among the power generation devices 51 to 55 connected to the smart grid 10, power generation device IDs may be assigned to the power generation devices 51 to 55 that are connectable to the smart grid 10 according to the contract agreement between the users and the resource aggregator, and the power generation device IDs may be recorded in association with the user IDs.

Electricity Storage Device ID and Electric Vehicle ID

The information processing apparatus 100 may include a memory storage unit that stores information indicative of the electricity storage devices 61 to 65 connectable to the smart grid 10 in association with the users. FIG. 5 is a table illustrating an example of the configuration of the memory storage unit that stores the electricity storage devices 61 to 65 in association with the users. In this embodiment, the electricity storage devices 61 to 65 are assigned respective electricity storage device IDs as their identification numbers. As illustrated in FIG. 5, the electricity storage device IDs and the user IDs may be recorded in a table that can record the electricity storage device IDs and the user IDs side by side. For example, when a user utilizes the present system that uses virtual electrical storage capacities, electricity storage device IDs may be assigned to the electricity storage devices 61 to 65 that are connectable to the smart grid 10 according to a contract agreement or the like between the user and the resource aggregator, and the electricity storage device IDs may be record in association with the user ID. The electric vehicles 71 to 73 may be connected to the smart grid 10 to serve as electricity storage devices when appropriate. In this embodiment, as illustrated in FIG. 5, the electric vehicles 71 to 73 are assigned respective electricity storage device IDs and are recorded in association with user IDs. The electric vehicles 71 to 73 may desirably be distinguished from the stationary-type electricity storage devices 61 to 65. As illustrated in FIG. 5, the electric vehicles may be assigned respective electric vehicle IDs, separately from the electricity storage device IDs. Note that the electric vehicle IDs may be associated with the users and recorded in a table that is different from the one that stores the electricity storage device IDs.

Depositing Process m2

The depositing process m2 is a process of increasing the virtual electrical storage capacity of a user according to the amount of electric energy that is output to the transmission grid 20 from an electrical equipment unit associated with the user. The electrical equipment units associated with the users may include, for example, the power generation devices 51 to 55, the electricity storage devices 61 to 65, the electric vehicles 71 to 73, and the like. It is possible to use a smart meter, for example, to measure the amount of electric energy that is output to the transmission grid 20 from the power generation devices 51 to 55, the electricity storage devices 61 to 65, and the electric vehicles 71 to 73, which serve as the electrical equipment units.

For example, in the depositing process m2, when electric power is output from one of the power generation devices 51 to 55 to the transmission grid 20, the power generation device from which electric power is output and the user thereof are identified. Then, the virtual electrical storage capacity of the corresponding user recorded in the first recording process m1 is increased according to the amount of electric energy that is output to the transmission grid 20 from the one of the power generation devices 51 to 55 (see FIG. 3). The electrical equipment units that are allowed to output electric power to the transmission grid 20 are not limited to the power generation devices 51 to 55. For example, the electricity storage devices 61 to 65 and the electric vehicles 71 to 73 may also output electric power to the smart grid 10. In that case as well, in the depositing process m2, the one of the electrical equipment units from which electric power is output and the corresponding user are identified. Then, the virtual electrical storage capacity of the corresponding user recorded in the first recording process m1 is increased according to the amount of electric energy that is output from the one of the electrical equipment units to the transmission grid 20 (see FIG. 3).

For example, as illustrated in FIG. 2, the depositing process m2 increases the virtual electrical storage capacity of the resident (i.e., the user) of the residential house A1 when surplus electric power arises in the residential house A1 and electric power is discharged from the residential house A1 to the transmission grid 20 of the smart grid 10. The depositing process m2 may predetermine how much virtual electrical storage capacity should be increased according to the amount of electric energy that is output to the transmission grid 20. For example, the depositing process m2 may be configured to increase the virtual electrical storage capacity by the same amount as the amount of electric energy output from the power generation device 51 to the smart grid 10.

In this case, in the depositing process m2, the virtual electrical storage capacity is updated according to the following equation (f1).

$$\text{Virtual Electrical Storage Capacity} = \text{Virtual Electrical Storage Capacity (0)} + \text{Discharged Electric Energy} \quad \text{(f1)}$$

Here, virtual electrical storage capacity (0) is the virtual electrical storage capacity before the depositing process m2, and discharged electric energy is the amount of electric energy that is discharged from the residential house A1 to the transmission grid 20 of the smart grid 10. For example, the depositing process m2 may be configured to increase the virtual electrical storage capacity of the user of the residential house A1 by 1 kWh when 1 kWh of electric power is discharged from the residential house A1 to the smart grid 10.

How much virtual electrical storage capacity should be increased according to the amount of electric energy in the depositing process m2 may be determined by simply adding the discharged electric energy, as in the foregoing equation (f1). The amount of the virtual electrical storage capacity to be increased in the depositing process m2 is not limited to being determined by the equation (f1) but may be set to a predetermined amount. For example, the depositing process m2 may be configured to increase the virtual electrical storage capacity by increasing or decreasing a predetermined proportion of the amount of electric energy that is output to the transmission grid 20 from one of the power generation devices 51 to 55 associated with a user. In other words, there may be a difference between the amount of electric energy that is output to the smart grid 10 and the amount of the virtual electrical storage capacity to be increased. For example, taking power transmission loss into account, the virtual electrical storage capacity to be increased may be reduced relative to the amount of electric energy that is output from a user to the smart grid 10.

For example, in the case where electric power supply and demand are tight, the tightness of electric power supply in the smart grid 10 is alleviated when electric power stored in an electricity storage device 61 or the like in the residential house A1 is discharged to the smart grid 10. Accordingly, the depositing process m2 may be configured to increase the virtual electrical storage capacity by adding a predetermined amount to the amount of electric energy that is output from the electricity storage device 61 to the smart grid 10. In this case, for example, in the case of adding 5% of the amount of electric energy that is output from the electricity storage device 61 to the smart grid 10, the depositing process m2 may be configured to increase the virtual electrical storage capacity by 1.05 kWh when 1 kWh of electric power is output from the electricity storage device 61 to the smart grid 10. This serves to alleviate the tightness of electric power supply in the smart grid 10 and also provides the user with an advantage of storing the virtual electrical storage capacity more efficiently. In addition, in the case where the smart grid 10 has a surplus of electric power, for example, the electric power surplus is alleviated when electric power stored in an electricity storage device or the like in the residential house A1. In this way, adjusting the amount of the virtual electrical storage capacity to be increased in the depositing process m2 may be used to adjust the supply and demand of electric power.

In addition, the depositing process m2 may be configured to deduct a predetermined amount corresponding to a commission fee from the virtual electrical storage capacity. The amount corresponding to the commission fee may be set freely, and may be predetermined in the information processing apparatus 100. For example, a predetermined proportion of the amount of electric energy that is output from an electrical equipment unit of the user to the smart grid 10 may be deducted, as the amount corresponding to the commission fee, from the virtual electrical storage capacity to be added. As a specific example, in the case of deducting 5% of the amount of electric energy that is output from the power generation device 51 to the smart grid 10, the depositing process m2 may be configured to increase the virtual electrical storage capacity by 0.95 kWh when 1 kWh of electric power is output from the power generation device 51 to the smart grid 10. Thus, by deducting the amount corresponding to the commission fee for the service of using the virtual electrical storage capacity from the virtual electrical storage capacity, the commission fee for the service of using the virtual electrical storage capacity can be cleared off by the virtual electrical storage capacity. This makes it possible to eliminate or reduce the process of clearing off the commission fee for the service of using the virtual electrical storage capacity by money or points.

Withdrawal Process m3

The withdrawal process m3 is a process of reducing the virtual electrical storage capacity of a user according to the amount of electric energy received by the user from the transmission grid 20.

In the withdrawal process m3, when a user receives electric power from the transmission grid 20, the user is identified from the device with which the user receives electric power. For example, when electric power is received and consumed from the transmission grid 20 at the residential house A1, the user is identified from a smart meter installed on the residential house A1. Likewise, when an electric vehicle is charged at a charging spot A6 in a city, the user is identified by acquiring an electric vehicle ID from the electric vehicle. Then, the virtual electrical storage capacity of the user recorded in the first recording process m1 is reduced according to the amount of electric energy that received by the user from the transmission grid 20 (see FIG. 3).

For example, as illustrated in FIG. 2, the withdrawal process m3 reduces the virtual electrical storage capacity of the resident (i.e., the user) of the residential house A1 in place of the electricity purchase process when a shortage of electric power occurs in the residential house A1 and the residential house A1 receives and uses electric power from the transmission grid 20 of the smart grid 10. Likewise, when a user receives electric power from the smart grid 10 through a charging station at a charging spot A6 in a city as well, the withdrawal process m3 may be used to reduce the virtual electrical storage capacity of the corresponding user. Thus, when a user receives electric power from the smart grid 10, the virtual electrical storage capacity of the corresponding user is reduced according to the amount of electric energy received. When a user receives electric power from the smart grid 10, the withdrawal process m3 may deduct an equivalent amount of electric energy from the virtual electrical storage capacity of corresponding user. This enables the user to receive electric power from the smart grid 10 using the virtual electrical storage capacity, without using the electricity purchase process.

The withdrawal process m3 may predetermine how much virtual electrical storage capacity should be reduced according to the amount of electric energy that is received by a user. For example, the withdrawal process m3 may be configured to reduce the virtual electrical storage capacity by the same amount as the amount of electric energy received by the user from the smart grid 10.

In this case, the withdrawal process m3 updates the virtual electrical storage capacity, for example, according to the following equation (f2).

$$\text{Virtual Electrical Storage Capacity} = \text{Virtual Electrical Storage Capacity}(0) - \text{Received Electric Energy} \quad \text{(f2)}$$

Here, virtual electrical storage capacity (0) is the virtual electrical storage capacity before the withdrawal process m3, and received electric energy is the amount of electric energy received by the user from the smart grid 10. For example, when a user receives 1 kWh of electric power from the smart grid 10 through a charging station at a charging spot A6 in a city, the withdrawal process m3 may be configured to reduce the virtual electrical storage capacity of the corresponding user by 1 kWh. Tus, an equivalent amount of virtual electrical storage capacity is reduced by the withdrawal process m3 for the virtual electrical storage capacity when electric power is received from the smart grid 10, but the cash asset of the user is not directly reduced.

How much virtual electrical storage capacity should be reduced according to the amount of electric energy in the withdrawal process m3 may be determined by simply subtracting the received electric energy, as specified by the foregoing equation (f2). The amount of the virtual electrical storage capacity to be reduced in the withdrawal process m3 is not limited to being determined by the equation (f2) but may be set to a predetermined amount. For example, the withdrawal process m3 may be configured to reduce the virtual electrical storage capacity by increasing or decreasing a predetermined proportion of the amount of electric energy that is output to the transmission grid 20 from one of the power generation devices 51 to 55 associated with a user. In other words, there may be a difference between the amount of electric energy that is supplied from the smart grid 10 and the amount of the virtual electrical storage capacity to be reduced. For example, taking power transmission loss into account, the virtual electrical storage capacity to be reduced may be increased relative to the amount of electric energy supplied from the smart grid 10 to the user.

In the case where electric power supply and demand are tight, the tightness of electric power supply in the smart grid 10 is alleviated by reducing the amount of discharging from the smart grid 10. In this case, it is desired to reduce the amount of discharging from the smart grid 10. For this reason, in the case where the electric power supply and demand are tight, the withdrawal process m3 may be configured to reduce the virtual electrical storage capacity by adding an extra amount of electric power corresponding to the tightness of electric power supply and demand to the amount of electric energy received from the smart grid 10. In this case, for example, in the case of adding 5% of the amount of electric energy that has been received from the smart grid 10, the withdrawal process m3 may be configured to reduce the virtual electrical storage capacity by 1.05 kWh when 1 kWh of electric power is received from the smart grid 10. This allows the user to be prompted to reduce electric power consumption and enables the smart grid 10 to alleviate the tightness in electric power supply. In addition, in such a case where the smart grid 10 has a surplus of electric power and the electricity storage devices 61 to 65 connected to the smart grid 10 have a low available capacity, it is possible to reduce the amount of electric energy for reducing the virtual electrical storage capacity relative to the amount of electric energy received from the smart grid 10. This allows the user to be prompted to increase electric power consumption. In this way, adjusting the amount of the virtual electrical storage capacity to be reduced in the withdrawal process m3 may be used to adjust the supply and demand of electric power.

In addition, the withdrawal process m3 may be configured to deduct a predetermined amount corresponding to a commission fee from the virtual electrical storage capacity. It is possible to set the amount corresponding to the commission fee freely. For example, a predetermined proportion of the amount of electric energy that has been received by a user from the smart grid 10 may be added, as the amount corresponding to the commission fee, to the amount of the virtual electrical storage capacity to be reduced. As a specific example, in the case where the amount corresponding to the commission fee is set to 5% of the amount of electric energy that the user has received from the smart grid 10, the withdrawal process m3 may be configured to reduce the virtual electrical storage capacity by 1.05 kWh when the user receives 1 kWh of electric power from the smart grid 10. In this case as well, by deducting the amount corresponding to the commission fee for the service of using the virtual electrical storage capacity from the virtual electrical storage capacity, the commission fee for the service of using the virtual electrical storage capacity can be cleared off by the virtual electrical storage capacity. This makes it possible to eliminate or reduce the process of clearing off the commission fee for the service of using the virtual electrical storage capacity with the use of money or points.

The system of using the virtual electrical storage capacity provided by this information processing apparatus 100 may be operated by, for example, an electric power utility operator or a resource aggregator as the operator. The commission fee for using the system and service of using the virtual electrical storage capacity may be billed monthly or yearly at a flat rate from the operator to the user who uses the system of using the virtual electrical storage capacity provided by this information processing apparatus 100. In this case, it is unnecessary to set the amount of commission fee every time the depositing process m2 or the withdrawal process m3 is performed. The system of using the virtual electrical storage capacity provided by this information processing apparatus 100 may be offered to users without charging fees. The system of using the virtual electrical storage capacity serves to reduce the processes and administrative burden that involves monetary exchange resulting from the sales and purchases of electricity by the users. Accordingly, it is expected that the system of using the virtual electrical storage capacity will become widely available if the system is offered to users without charging fees corresponding to such an administrative burden, for example, for free.

As described above, the information processing apparatus 100 disclosed herein executes a first recording process m1 of recording a virtual electrical storage capacity in association with a user, a depositing process m2, and a withdrawal process m3. The first recording process m1 involves recording a virtual electrical storage capacity in association with a user. The depositing process m2 involves increasing the virtual electrical storage capacity of the corresponding user according to the amount of electric energy that is output to the transmission grid 20 from an electrical equipment unit associated with the user. The withdrawal process m3 involves reducing the virtual electrical storage capacity of the corresponding user according to the amount of electric energy that has been used by the user from the transmission grid 20. This allows the user to store generated electric power in the smart grid 10 in the form of virtual electrical storage capacity and to receive electric power through the smart grid 10 using the virtual electrical storage capacity.

The virtual electrical storage capacity recorded in the first recording process m1 may also be treated as the amount of electric energy that is actually stored in the electricity storage devices 61 to 65 connected to the smart grid 10. The user is allowed to receive electric power through the smart grid 10 according to the amount of electric energy of the virtual electrical storage capacity. In addition, the virtual electrical storage capacity is the amount of electric energy that is considered as the electric power that can be virtually disposed of freely by the user. Also, the virtual electrical storage capacity may be the electric power that can be virtually disposed of freely by the user.

In the depositing process m2, the user is, for example, allowed to virtually store the electric power generated in the residential house A1 as the virtual electrical storage capacity in the smart grid 10, without selling the electric power as surplus electric power. In the withdrawal process m3, the user is allowed to use the electric power stored as the virtual electrical storage capacity through the smart grid 10 at any desired location and at any desired time. Therefore, the user does not need to purchase electricity each time when the user receives electric power from the smart grid 10, as long as a sufficient virtual electrical storage capacity has been stored.

As a result, for example, as long as sufficient electricity storage devices are connected to the smart grid 10 so as to be able to accept surplus electric power from the residential house A1, surplus electric power can be stored in the smart grid 10 as a virtual electrical storage capacity even when the residential house A1 is not provided with a stationary-type electricity storage device. This means that, by storing surplus electric power as the virtual electrical storage capacity in the smart grid 10, it is possible to obtain a condition similar to that in which there is a stationary-type electricity storage device in the residential house A1 even when the residential house A1 is not provided with a stationary-type electricity storage device. As a result, the user of the residential house A1 can reduce the capacity of the stationary-type electricity storage device or altogether eliminate the installation of the stationary-type electricity storage device, for example, to reduce the cost to be spent on the stationary-type electricity storage device.

Moreover, when the user possesses an electric vehicle that is connectable to the smart grid 10, the user is able to use the virtual electrical storage capacity to feed electric power to the electric vehicle at any desired location through the smart grid 10. In this case, as illustrated in FIG. 5, the electric vehicle ID of the electric vehicle is stored in association with the user ID as well as with the electricity storage device. For this reason, the withdrawal process m3 of the information processing apparatus 100 may be programmed to recognize the electric vehicle ID when the electric vehicle is connected even if the electric vehicle is charged using a charging station that can be connected to the smart grid 10 at any location. Thereby, when the electric vehicle ID is identified, the corresponding user ID is identified, and the amount of electric energy equivalent to the amount of electric energy received by the electric vehicle is subtracted from the virtual electrical storage capacity of the user that has been identified by the corresponding user ID.

Thus, by using the virtual electrical storage capacity achieved by the information processing apparatus 100 proposed herein, the user is able to virtually store the electric power generated at his/her own house in the smart grid 10. The user is allowed to receive the electric power that is virtually stored in the smart grid 10 in the form of virtual electrical storage capacity through the smart grid 10 when a shortage of electric power occurs in the residential house A1. The user is also allowed to receive electric power from the smart grid 10 to an electric vehicle using the virtual electrical storage capacity even at a travel destination.

Thus, the virtual electrical storage capacity may also be considered as the right to receive a corresponding amount of electric energy from the smart grid 10. In other words, the virtual electrical storage capacity may be considered as the amount of electric energy that the user has stored in the smart grid 10 and also considered as the right to receive the corresponding amount of electric energy through the smart grid 10. For example, when the user is a resident of the residential house A1 equipped with solar panels and goes out for a trip to a distant location on a weekend using the electric vehicle 71, the electric power generated by the solar panels is stored as a virtual electrical storage capacity through the smart grid 10. Since the virtual electrical storage capacity is the right to receive a corresponding amount of electric power through the smart grid 10, the user is allowed to receive electric power from the smart grid 10 using the stored virtual electrical storage capacity when the user connects the electric vehicle to the smart grid 10 at a charging spot at the travel destination. At that time, a process is performed to reduce the virtual electrical storage capacity of the user according to the amount of electric energy that has been received by the user. In such a way, the user is able to virtually store the electric power generated at the user's own house into the smart grid 10 and to receive electric power at any desired time and at any desired location. As a result, by storing the electric power generated at the residential house A1 into the smart grid 10 as a virtual electrical storage capacity, the user of the residential house A1 is allowed to maximally use the electric power generated at the user's own house without leaving a surplus of electric power.

The user is not limited to the level of individual person. For example, a solar panel power generation operator may be able to store a virtual electrical storage capacity by using the virtual electrical storage capacity when discharging electric power to the smart grid 10. When the solar panel power generation operator needs to use electric power for another business operation, the power generation operator is able to receive electric power from the smart grid 10 using the virtual electrical storage capacity that has been stored by the solar panel power generation. Thus, the user may be at the level of juristic person. Accordingly, large-scale consumers that also conduct a power generation business or the like may also be employed as users, and the virtual electrical storage capacity is managed in a centralized manner so that the amount of electric power used can be cleared off by the virtual electrical storage capacity. A juristic person user may store the electric power generated by a power generation business into the smart grid 10 and consume the electric power for another business operation. Thus, the user is not limited to the level of individual person. When, as described above, electric power is received from the smart grid 10 through the withdrawal process m3 using the virtual electrical storage capacity, not through sales of electricity or purchases of electricity, for example, the information processing apparatus 100 may be configured to communicate with a control terminal of the user and execute a predetermined process in cooperation with the control terminal of the user. When this is the case, the electric power utility operator also uses electric power through the virtual electrical storage capacity, which reduces the processes of paying money to users according to the sales of electricity by the users and receiving money according to the purchases of electricity by the users. This reduces administrative burden that accompanies monetary exchange in comparison with the cases where interchange of electric power is processed each time by sales of electricity and purchases of electricity.

The information processing apparatus 100 may be configured to be able to perform various processes, such as transferring, purchasing, and selling processes of the virtual electrical storage capacity. In these processes, the information processing apparatus 100 may be configured to communicate with a control terminal of the user and execute a predetermined process in cooperation with the control terminal of the user. The control terminal of the user may be a personal computer, a smartphone, or the like, for example. The control terminal of the user may be a control terminal for HEMS or the like installed for monitoring the interchange of electric power with a smart meter. The information processing apparatus 100 may be configured to be provided with a dedicated web site so that predetermined information can be input through the web site. Alternatively, the information processing apparatus 100 may be configured to include dedicated software embedded in a personal computer or a smartphone so that predetermined information can be input through the processes of the software. For example, the information processing apparatus 100 may be configured to communicate with a personal computer or a smartphone and cause a control terminal of the user to display a control screen panel for executing various processes so that necessary information can be input therein. The information processing apparatus 100 may be configured to be able to obtain information necessary for the processes of transferring, purchasing, and selling of the virtual electrical storage capacity through these control terminals of users.

Transferring Process m4

The transferring process m4 is a process of transferring the virtual electrical storage capacity between users. For example, as illustrated in FIG. 3, when the virtual electrical storage capacity is transferred from the power generation operator A4, which can store the virtual electrical storage capacity easily by power generation, to the factory A3, which consumes a large amount of electric power, the transferor user A4 and the transferee user A3 may be identified with their user IDs and the capacity to be transferred (transfer capacity dl) may be determined. The information of the transferor user A4, the transferee user A3, and the transfer capacity dl may be obtained through, for example, the control terminal of the user.

In this case, the virtual electrical storage capacity of the transferor user A4 may be reduced by an amount corresponding to the transfer capacity, and the virtual electrical storage capacity of the transferee user A3 may be increased by the amount corresponding to the transfer capacity. As described above, the virtual electrical storage capacity can be transferred between users. This allows electric power to be interchanged between the users by the process of transferring the virtual electrical storage capacity, not by the sales or purchases of electricity. That is, the user who has received the transfer of the virtual electrical storage capacity can receive an amount of electric power corresponding to the transferred virtual electrical storage capacity through the smart grid 10. The transferring process m4 enables transferring and leasing of the virtual electrical storage capacity without transferring money between the users. Although the virtual electrical storage capacity is transferred in this case, the actual electric power is interchanged through the smart grid 10. For this reason, it is unnecessary to actually transfer the electric power corresponding to the transferred amount between the electricity storage devices of the users.

Purchasing Process m5

The purchasing process m5 is a process of purchasing the virtual electrical storage capacity of a user. The purchasing process m5 includes an embodiment in which the user purchases the virtual electrical storage capacity from an electric power utility operator, for example, and an embodiment in which the user purchases the virtual electrical storage capacity from another user. Note that, if the electric power utility operator is considered as one of the users, both embodiments may be implemented by the same process.

Figure 6:
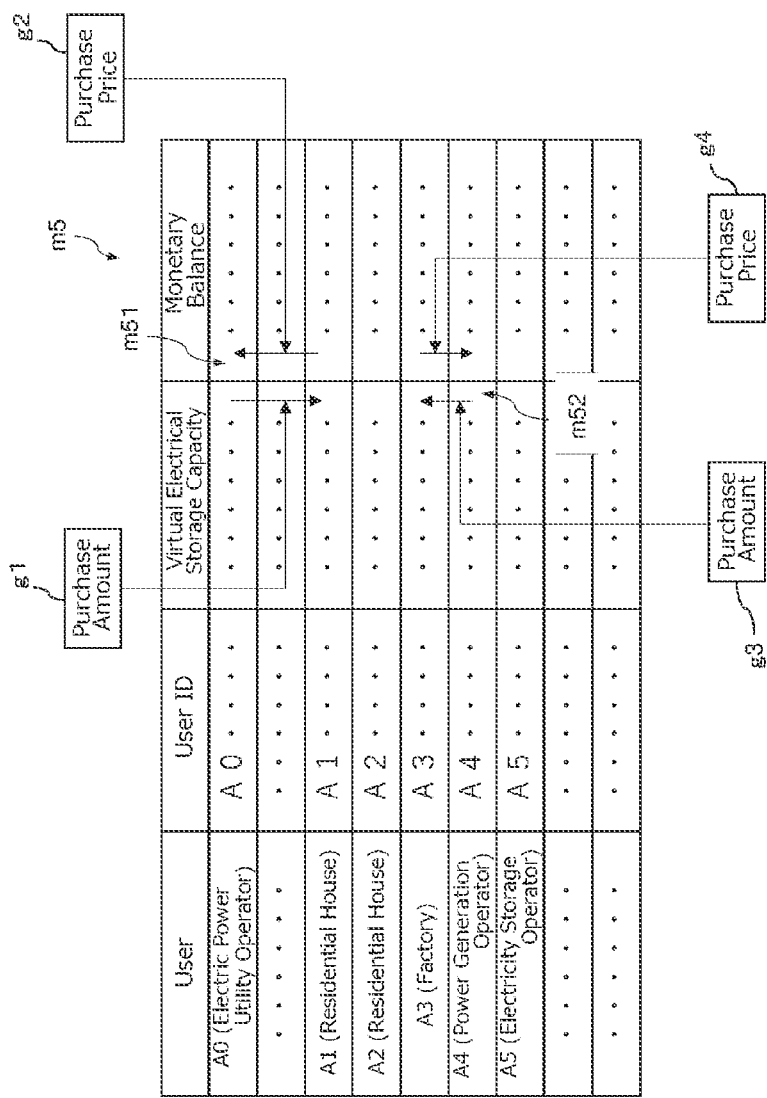
FIG. 6 is a schematic view illustrating processes m51 and m52, each of which is an example of purchasing process m5.

FIG. 6 is a schematic view illustrating processes m51 and m52, each of which is an example of the purchasing process m5. In the example shown in FIG. 6, the user A1 purchases the virtual electrical storage capacity from an electric power utility operator A0 in the purchasing process m51. As described previously, the virtual electrical storage capacity may also be considered as the right to receive electric power from the smart grid 10. In this case, the information processing apparatus 100 determines the seller to be the electric power utility operator A0, and identifies a purchaser user A1, a purchase amount g1, and a purchase price g2. In the purchasing process m5, the virtual electrical storage capacity of the user may be increased according to the purchase amount. On the other hand, the monetary balance of the user may be reduced according the purchase amount. Alternatively, the monetary balance of the electric power utility operator may be increased according to the purchase amount.

Here, the monetary balances managed by the information processing apparatus 100 may be managed as the record of monetary values each time. For example, the operator that offers the system or service of using the virtual electrical storage capacity does not need to produce monetary exchange between the users each time. The purchasing process m5 may also be configured to exchange the monetary balance as appropriate for commercially usable points that are given to the user. The purchasing process m5 may also be configured to allow the user to check the monetary balance as necessary and allow the user to request a money transfer into a bank account actually owned by the user or request an exchange process for points. The purchasing process m5 may be configured to allow the operator that offers the system and service of using the virtual electrical storage capacity to execute a money transfer process or an exchange for points through a payment handling operator such as a bank or a credit card company. When the purchasing process m5 is configured to allow the operator to execute a money transfer process or an exchange for points through a payment handling operator, the operator does not need to directly hold or manage the information of bank accounts and credit cards of the users.

In the purchasing process m52, the user A3 purchases the virtual electrical storage capacity from the user A4. In this case, the information processing apparatus 100 determines the seller to be the user A4 and identifies a purchaser user A3, a purchase amount g3, and a purchase price g4. The information necessary for the purchasing process may be obtained through, for example, the control terminal of the user A3. In the purchasing process m52, the virtual electrical storage capacity of the user A3 may be increased and the virtual electrical storage capacity of the user A4 may be reduced according to the purchase amount g3. On the other hand, the monetary balance of the user A3 may be reduced and the monetary balance of the user A4 may be increased according the purchase price g4. In this way, the purchasing process m5 may transfer the virtual electrical storage capacity between the vendor and the purchaser according to the purchase amount and also transfer the monetary balance between the vendor and the purchaser according to the purchase price. The information necessary for such a purchasing process m5 may be processed according to the input from, for example, the control terminal of the user that is a purchaser. For example, the information necessary for the purchasing process m51 may be obtained through the control terminal of the user A1 that is a purchaser. For example, the information necessary for the purchasing process m52 may be obtained through the control terminal of the user A3 that is a purchaser.

Selling Process m6

Figure 7:
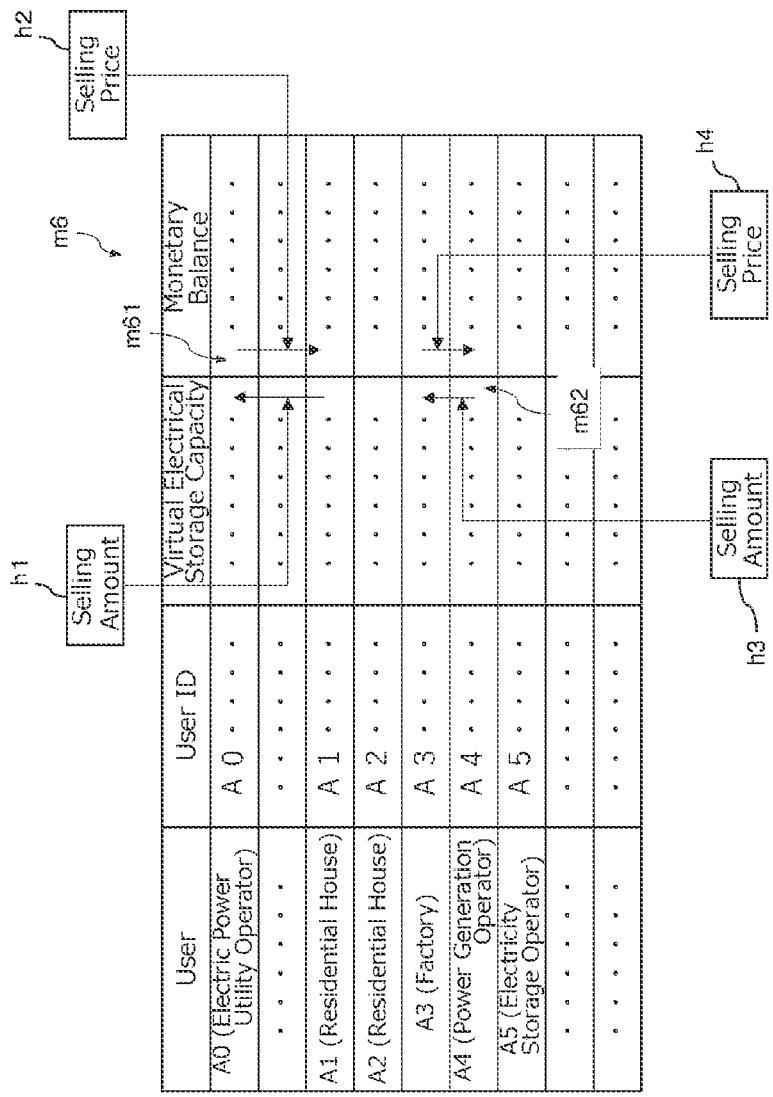
FIG. 7 is a schematic view illustrating processes m61 and m62, each of which is an example of selling process m6.

The selling process m6 is a process of selling the virtual electrical storage capacity of a user. FIG. 7 is a schematic view illustrating processes m61 and m62, each of which is an example of the selling process m6. The selling process m6 includes an embodiment (m61) in which, for example, the user sells the virtual electrical storage capacity to an electric power utility operator and an embodiment (m62) in which the user sells the virtual electrical storage capacity to another user. Note that, if the electric power utility operator is considered as one of the users, both embodiments may be implemented by the same process.

For example, as illustrated in FIG. 7, in the selling process m61 in which the user A1 sells the virtual electrical storage capacity to the electric power utility operator A0, the information processing apparatus 100 determines the seller to be the user A1 and the vendee to be the electric power utility operator A0, and identifies the selling amount h1 and the selling price h2. Then, the information processing apparatus 100 reduces the virtual electrical storage capacity of the user A1 and increases the virtual electrical storage capacity of the electric power utility operator A0 according to the selling amount h1. The information processing apparatus 100 may also increase the monetary balance of the user A1 and reduces the monetary balance of the electric power utility operator A0 according to the selling price h2. On the other hand, in the selling process m62 in which the user A4 sells the virtual electrical storage capacity to the user A3, the information processing apparatus 100 determines the seller to be the user A4 and the vendee to be the user A3, and identifies the selling amount h3 and the selling price h4. Then, the information processing apparatus 100 reduces the virtual electrical storage capacity of the user A4 and increases the virtual electrical storage capacity of the user A3 according to the selling amount h3. The information processing apparatus 100 may also increase the monetary balance of the user A4 and reduces the monetary balance of the user A3 according to the selling price h2. In this way, the selling process m6 enables the virtual electrical storage capacity to be sold between arbitrary users. The information necessary for such a selling process m6 may be processed according to the input obtained from, for example, the control terminal of the user that is a seller. For example, the information necessary for the selling process m61 may be obtained through the control terminal of the user A1 that is a seller. For example, the information necessary for the selling process m62 may be obtained through the control terminal of the user A4 that is a seller.

Price Setting Process m7

The price setting process m7 is a process of setting a price per unit amount of the virtual electrical storage capacity. The price setting process m7 sets, for example, a distribution price applied when the virtual electrical storage capacity is traded between users.

For example, the service provider of the smart grid 10 may also serve as an electricity storage operator A5 equipped with a large-scale electricity storage equipment 65 that has sufficient capability of storing electric power discharged to the smart grid 10. In addition, according to contract agreements with users, the service provider of the smart grid 10 may be configured to make use of the available capacity of the electricity storage devices 61 to 65 of the users. In this case as well, the service provider of the smart grid 10 may also have sufficient capability of storing electric power discharged to the smart grid 10. In this case, the service provider of the smart grid 10 may adjust the amount of electric energy supplied to smart grid 10 by the electricity storage device 65 appropriately. The service provider of the smart grid 10 can set the price per unit amount of the virtual electrical storage capacity that serves as the reference appropriately in the information processing apparatus 100. The price set here may serve as the reference price per unit amount of the virtual electrical storage capacity because it may be widely made available to users. The resource aggregator 13 can control the smart grid 10 to adjust the electric power supply and demand. Accordingly, the resource aggregator 13 may serve the role of such a service provider of the smart grid 10.

Moreover, by means of the price setting process m7, for example, the electric power utility operator A0 can set the price per unit amount of the virtual electrical storage capacity that is applied when trading the virtual electrical storage capacity between users. The power generation operator A4 with solar panels can set the price per unit amount for selling of the virtual electrical storage capacity. The factory operator A3 can set the price per unit amount for purchasing of the virtual electrical storage capacity. These prices may be made public on a web site that is open to users that are allowed to trade (sell and buy) the virtual electrical storage capacity, or on a closed web site between specific users. This is expected to promote trading of the virtual electrical storage capacity between users.

In this case, a restrictive condition under which a user is allowed to receive electric power from the smart grid may be specified for the virtual electrical storage capacity. When it is possible to specify restrictive conditions under which a user is allowed to receive electric power from the smart grid, the solar panel power generation operator A4 is able to sell a virtual electrical storage capacity provided with a restrictive condition under which electric power can be received from the smart grid. For example, the solar panel power generation operator A4 generates a large amount of power on a sunny day. However, if there is no business operator that uses the electric power, the power generation operator A4 may in some cases be forced to stop the power generation due to demand response. In such a circumstance, the solar panel power generation operator A4 may sell, at a low price, a virtual electrical storage capacity with a restrictive condition under which electric power is allowed to be received from the smart grid according to a peak time slot of the electric power generated by the solar panel power generation operator A4.

The electricity storage operator A5 may purchase such a low-price virtual electrical storage capacity to prompt the solar panel power generation operator to generate power, and may store the electric power into the electricity storage device 65 through the smart grid 10. The factory operator A3 is allowed to procure electric power at low cost, for example, when the factory is desired to increase the production. It is also possible to set the price of the virtual electrical storage capacity to be purchased concurrently with the time when the factory is desired to increase the production, to invite a power generation operator selling the virtual electrical storage capacity that is usable at that time, and to purchase the virtual electrical storage capacity that is usable at that time in advance. This means that, even in such cases where electric power supply becomes tight at a time when the factory needs to increase the production but the amount of electric energy to be used should be reduced due to a request from demand response, it is possible to obtain a virtual electrical storage capacity that can be used at that time and to thereby control the smart grid 10 to receive sufficient electric power preferentially.

From such a viewpoint, the virtual electrical storage capacity may be provided with a restrictive condition under which a user is allowed to receive electric power from the smart grid. FIG. 8 is a schematic view illustrating another embodiment of a table that is recorded in the first recording process m1. In this case, as illustrated in FIG. 8, for example, the first recording process (m1) may record a virtual electrical storage capacity for each of restrictive conditions under which a user is allowed to receive electric power from the smart grid. As described previously, the virtual electrical storage capacity may be considered as the right to receive a corresponding amount of electric energy from the smart grid 10. In the first recording process m1, as illustrated in FIG. 8, the virtual electrical storage capacities may be set as the rights to be allowed to receive electric power from the smart grid 10 within a limited time, such as specified by time slots, time and date, and days of the week.

Thus, the price setting process m7 may be configured to, for example, store prices per unit amount of the virtual electrical storage capacity within a predetermined memory storage area of the information processing apparatus 100. The price setting process m7 may also be provided with the function of making the prices public between users that are able to trade (buy and sell) the virtual electrical storage capacity. Where the prices are made public may be a web site that is widely open to users or a closed web site that is made public between specific users.

In this case, for example, the price of the virtual electrical storage capacity may vary in association with the tightness of electric power supply and demand of the smart grid 10 that is managed by the resource aggregator 13. The price setting may be carried out in response to an electric power supply instruction from the aggregation coordinator 11. In the case of trading between users, the price per unit amount of the virtual electrical storage capacity may be set differently from, for example, the prices for sales of electricity or the purchases of electricity. Although the virtual electrical storage capacity is the right to receive electric power from the smart grid 10, it is possible to place a restriction on when to enforce the right. For example, the price of the virtual electrical storage capacity may be set for each of the restrictive conditions so that the price of the virtual electrical storage capacity varies depending on different time periods, such as time slots, times and dates, and days of the week, in which the user is allowed to receive electric power from the smart grid 10.

Exchange Process m8 and Exchange Setting Process m9

The exchange process m8 is a process of exchanging the virtual electrical storage capacity for a predetermined commercially usable point. The exchange setting process m9 is a process of setting a number of points to be exchanged per unit of the virtual electrical storage capacity. Such an exchange process allows the virtual electrical storage capacity to be exchanged for commercially usable points. In the exchanging for points as well, it is possible to set a reference exchange rate and to set an exchange rate for user-to-user trading, similar to the price setting for the virtual electrical storage capacity. In addition, the virtual electrical storage capacity to be exchanged may be provided with a restrictive condition under which a user is allowed to receive electric power from the smart grid 10. In the first recording process m1, point balances may be recorded in association with user IDs, as shown in FIG. 8. As a result of this, the point balances of users are recorded, the exchanges between virtual electrical storage capacities and points are also recorded.

The capacity-data transmission process m10 is a process of transmitting the virtual electrical storage capacity of a user to a predetermined terminal of the user. This allows the user to know the virtual electrical storage capacity. The information processing apparatus 100 may allow the user to check the virtual electrical storage capacity of the user, for example, through a web site to which the user can access with a terminal. The information processing apparatus 100 may periodically transmit information of the virtual electrical storage capacity to a pre-registered mail address of the user.

As described above, the virtual electrical storage capacity may be increased not only by outputting electric power to the transmission grid 20 of the smart grid 10 but also by transferring or purchasing of the virtual electrical storage capacity. For this reason, the depositing process m2 may not always be performed. Basically, the virtual electrical storage capacity reduces when electric power is received from the transmission grid 20 of the smart grid 10. However, power generation operators, individuals installed with a large number of solar panels, and the like output electric power to the transmission grid 20 of the smart grid 10 in many cases, so they tend to obtain virtual electrical storage capacity through the depositing process m2 more easily. These kinds of users may dispose of the virtual electrical storage capacity by selling the virtual electrical storage capacity or exchanging it for points. Thus, because the virtual electrical storage capacity corresponding to the amount of electric energy in which a user is allowed to receive from the smart grid is set in association with the user, it is possible to achieve electricity trading with a higher degree of freedom and to improve user convenience in utilizing electric power.

Second Recording Process m11

The smart grid 10 is, as illustrated in FIG. 2, connected to a plurality of electricity storage devices 61 to 65. The second recording process m11 is a process of recording, of the electricity storage capacities of the electricity storage devices 61 to 65 connected to the smart grid 10, an allocated capacity that is allocated to a user in association with the user. Such a second recording process m11 makes it possible to control the electricity storage devices 61 to 65 to allow another user to use an available capacity of at least one of the electricity storage devices 61 to 65 connected to the smart grid 10.

In this case, as illustrated in FIG. 8, the information processing apparatus 100 may be configured to record, of the electricity storage capacities of the electricity storage devices 61 to 65, an allocated capacity allocated to a user in association with the user. In the embodiment shown in FIG. 8, a data table prepared for the information processing apparatus 100 is configured to record allocated capacities that are allocated to respective users and user IDs identifying the users side-by-side. The allocated capacity allocated to a user can be used as an electricity storage capacity dedicated to the user, for example, in place of a home-use storage battery. The allocated capacity allocated to a user has a dedicated portion to the user. Therefore, when the user has a surplus electric power, the surplus electric power is discharged through the smart grid 10 so that it can be controlled to be stored in the allocated capacity allocated to the user. Such an allocated capacity allocated to the user may be automatically provided to the user when the user receives service through the smart grid 10, or may be separately provided as an option.

For example, in the embodiment shown in FIG. 2, a user A5 equipped with a large-scale electricity storage equipment 65 is able to store a sufficient amount of electric power in the large-scale electricity storage equipment 65. For this reason, the user A5 can provide a service of allocating an electricity storage capacity to other users to allow the other users to use the electricity storage capacity. For example, the user A4 that is a solar panel power generation operator may be able to store electric power any time by discharging the electric power generated by the solar panel 54. Therefore, the user A4 is not affected by the demand response from the aggregation coordinator 11 and is allowed to continue power generation with the solar panel 54. In addition, when a shortage of electric power occurs in the smart grid 10, the user A4 can supply electric power (i.e., sell electricity) to the smart grid 10 to thereby make a corresponding profit. Thus, with the second recording process m11, the solar panel power generation operator A4 is allowed to have a dedicated electricity storage capacity in the large-scale electricity storage equipment 65 of the user A5 to store a surplus of electric power. This enables the solar panel power generation operator A4 to fully utilize the power generation capability of the solar panels to generate electric power. The large-scale electricity storage equipment 65 may set a price for allocating an electricity storage capacity to a user.

Sharing Setting Process m12

The sharing setting process m12 is a process of setting a portion of an electricity storage capacity of an electricity storage device connected to the smart grid to be available for sharing with a user connected to the smart grid. When employing such a sharing setting process m12, the sharing setting process m12 allows a portion of the electricity storage capacity of the electricity storage device to be used by an arbitrary user participating in the smart grid 10.

Figure 9:
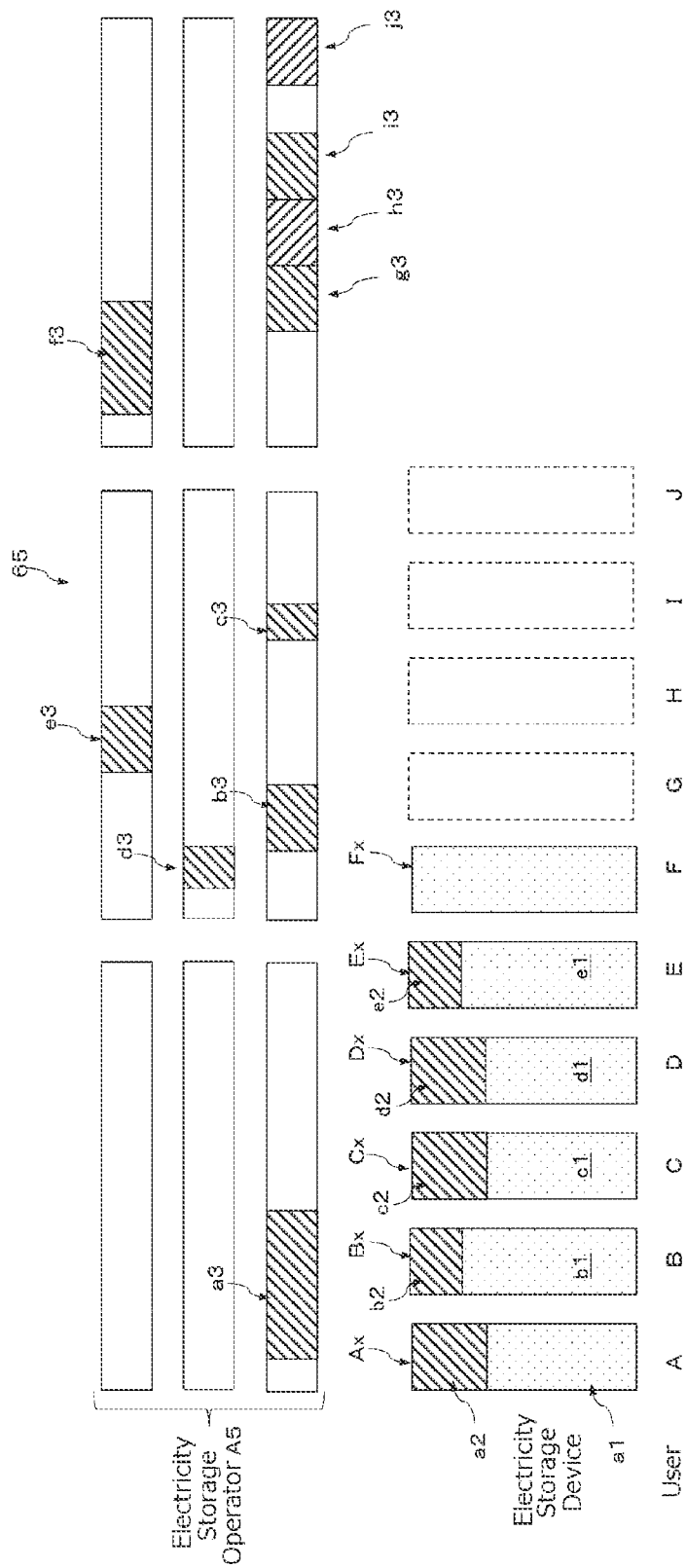
FIG. 9 is a schematic view illustrating a system that is implemented by a second recording process m11 and a sharing setting process m12.

FIG. 9 is a schematic view illustrating a system that is implemented by the second recording process m11 and the sharing setting process m12. In the example schematically shown in FIG. 9, users A to F are provided with respective stationary-type electricity storage devices Ax to Fx each connected to the smart grid 10. Among them, the electricity storage device Ax of the user A is provided with an electricity storage capacity a1 that is used exclusively by the user A and an electricity storage capacity a2 that is made available to the participants of the smart grid 10 through the smart grid 10. The electricity storage capacity a2 is open to other users when it is free. In this case, when the electricity storage capacity a2 is free, the electricity storage capacity a2 can store the electric power generated by participants (other users) of the smart grid 10 through the smart grid 10. The electric power stored in the electricity storage capacity a2 may be stored in the information processing apparatus 100 as a virtual electrical storage capacity in association with the other user that has stored the generated electric power. The sharing setting process m12 may set a portion of or the whole of the capacity of the electricity storage device to be a capacity such as the electricity storage capacity a2. In the embodiment shown in FIG. 9, electricity storage devices Bx to Ex of users B to E are likewise provided with electricity storage capacities b1 to e1 that are exclusively used by the user A and electricity storage capacities b2 to e2 that are made available to participants of the smart grid 10 through the smart grid 10.

The information processing apparatus 100 may disclose the information of electricity storage capacities that are made available to participants of the smart grid 10 through the smart grid 10, on a dedicated web site or the like to the users participating the smart grid 10. Based on the disclosed information, the user participating the smart grid 10 may execute a process of storing generated electric power into the electricity storage capacity that is set for sharing. In such a process, the information processing apparatus 100 identifies the user ID in response to a control operation of the user and also causes an electrical equipment unit of the corresponding user identified by the user ID to discharge electric power to the smart grid 10. Then, the corresponding amount of electric power may be stored into the electricity storage capacity that is made available for sharing through the smart grid 10. Taking power transmission loss or the like into account, the amount of electric energy that is stored in the electricity storage capacity made available for sharing may be smaller than the amount of electric energy discharged from the electrical equipment unit of the user to the smart grid 10.

In the embodiment shown in FIG. 9, the electricity storage device Fx of the user F is not provided with an electricity storage capacity that is available to participants of the smart grid 10 through the smart grid 10. In this case, the user F is allowed to use the entire electricity storage device Fx exclusively on his/her own. Thus, the information processing apparatus 100 may be configured so that the user can selectively determine whether or not to set an electricity storage capacity available to participants of the smart grid 10. It is also possible that the information processing apparatus 100 may be configured to allow the user to obtain an incentive according to the use of the electricity storage capacity when setting an electricity storage capacity available to participants of the smart grid 10 through the smart grid 10.

In the example shown in FIG. 9, the users A to F are provided with dedicated capacities a3 to f3 in the electricity storage device 65 connected to the smart grid 10, which are rented from the electricity storage operator A5. In this case, the electricity storage operator A5 may record the allocated capacities of the electricity storage capacity of the electricity storage device 65 which are respectively allocated to the users A to F in association with the users A to F. This enables the users A to F to store surplus electric power into the electricity storage device 65 of the electricity storage operator A5 even when the capacities of their own electricity storage devices Ax to Fx are full. Then, the stored electric power may be managed by the information processing apparatus 100 as the virtual electrical storage capacity. As a result, the users A to F are allowed to receive electric power through the smart grid 10 as appropriate. On the other hand, users G to J do not possess their own electricity storage devices. However, the users G to J are provided with dedicated allocated capacities g3 to j3 in the electricity storage device 65 of the electricity storage operator A5. Therefore, although the users G to J do not possess their own electricity storage devices, the users G to J are able to store a surplus of electric power generated at their homes in the electricity storage device 65 of the electricity storage operator A5. Then, the stored electric power may be managed by the information processing apparatus 100 as the virtual electrical storage capacity. This allows the users G to J to receive the electric power generated at their homes through the smart grid 10 at any desired time and at any desired location. Such a process can be implemented by the second recording process m11.

In addition, blockchain technology, for example, may be used for the trade records of the depositing process m2, the withdrawal process m3, the transferring process m4, the purchasing process m5, the exchange process m8, and so forth of the virtual electrical storage capacity, the allocated capacity allocated to users, the monetary balance, the point balance, and the like in the information processing apparatus 100.

The system utilizing the virtual electrical storage capacity as described above records the amount of electric energy that each of the users can receive from the transmission grid 20 of the smart grid 10 in the information processing apparatus 100 as the virtual electrical storage capacity. In this case, a surplus of the electric power generated by the power generation devices 51 to 55 connected to the smart grid 10 is output to the smart grid 10 and is also recorded as the electric power that each of the users is allowed to receive from the transmission grid 20 of the smart grid 10 in association with the corresponding users. Irrespective of time and location, the user is allowed to receive electric power according to the virtual electrical storage capacity from the smart grid 10 at any desired time and at any desired location. When such a system of virtual electrical storage capacity is used by all the users participating in the smart grid 10, generated electric power are interchanged or rented between users in the user community connected by the smart grid 10. Moreover, the second recording process m11 and the sharing setting process m12 allow interchange of the electricity storage functions of the electricity storage devices 61 to 65 connected to the smart grid 10 between users. This makes it possible to fully utilize the functions of the power generation devices 51 to 55 and the electricity storage devices 61 to 65 connected to the smart grid 10. This is expected to allow the electric power generated in the user community to be consumed within the community more efficiently. It is possible to maximize self-generation and self-consumption.

Various embodiments of the invention have been described hereinabove according to the present disclosure. Unless specifically stated otherwise, the embodiments described herein do not limit the scope of the present invention. It should be noted that various other modifications and alterations may be possible in the embodiments of the invention disclosed herein. In addition, the features, structures, or steps described herein may be omitted as appropriate, or may be combined in any suitable combinations, unless specifically stated otherwise.

What is claimed is:

1. An information processing apparatus for a smart grid, the smart grid comprising a transmission grid being electrically connected to a plurality of electrical equipment units and a communication network transmitting information to the information processing apparatus of at least an amount of electrical energy transmitted through the transmission grid, the information processing apparatus being configured to execute:
   a first recording process of recording an amount of electrical energy storage that corresponds to an amount of electrical energy generated by a particular user and transmitted to an electrical energy storage device electrically connected with the transmission grid such that the particular user obtains, in exchange for the amount of electrical energy transmitted to the electrical energy storage device, an electrical energy storage capacity on the smart grid corresponding to the amount of electrical energy generated by the particular user and transmitted to the electrical energy storage device,
   a second recording process of recording an amount of electrical energy that has been received by the particular user from the transmission grid and reducing the electrical energy storage capacity on the smart grid of the particular user by an amount based on the amount of electrical energy that has been received by the particular user from the smart grid, and
   decreasing the electrical energy storage capacity on the smart grid of the particular user by an amount based on an amount of electrical energy the particular user has instructed the information processing apparatus to transfer from the electrical energy storage device connected with the smart grid to a second user.

2. The information processing apparatus according to claim 1, wherein the first recording process records the electrical energy storage capacity on the smart grid for each of restrictive conditions under which a user is allowed to receive electrical energy from the smart grid.

3. The information processing apparatus according to claim 2, wherein the electrical energy storage capacity on the smart grid is provided with a restrictive condition that restricts a time period in which a user is allowed to receive electrical energy from the smart grid depending on at least one of time slot, time and date, and a day of the week.

4. The information processing apparatus according to claim 1, wherein the second recording process includes further reducing the electrical energy storage capacity on the smart grid by an amount corresponding to a predetermined commission fee.

5. The information processing apparatus according to claim 1, being further configured to execute a depositing process of increasing the electrical energy storage capacity on the smart grid of the user according to an amount of electrical energy that has been output to the transmission grid from an electrical equipment unit associated with the corresponding user.

6. The information processing apparatus according to claim 5, wherein the depositing process is configured to increase the electrical energy storage capacity on the smart grid by increasing or decreasing a predetermined proportion of the amount of electrical energy that has been output to the transmission grid from the electrical equipment unit associated with the user.

7. The information processing apparatus according to claim 5, wherein the depositing process is configured to deduct an amount corresponding to a predetermined commission fee from the electrical energy storage capacity on the smart grid.

8. The information processing apparatus according to claim 1, being further configured to execute a transferring process of transferring the electrical energy storage capacity on the smart grid between users.

9. The information processing apparatus according to claim 1, being further configured to execute a purchasing process of purchasing the electrical energy storage capacity on the smart grid of the user.

10. The information processing apparatus according to claim 1, being further configured to execute a selling process of selling the electrical energy storage capacity on the smart grid of the user.

11. The information processing apparatus according to claim 1, being further configured to execute a price setting process of setting a price per unit of the electrical energy storage capacity on the smart grid.

12. The information processing apparatus according to claim 1, being further configured to execute an exchange process of exchanging the electrical energy storage capacity on the smart grid for a predetermined commercially usable point.

13. The information processing apparatus according to claim 12, being further configured to execute an exchange setting process of setting a number of points to be exchanged per unit of the electrical energy storage capacity on the smart grid.

14. The information processing apparatus according to claim 1, being further configured to execute a capacity-data transmission process of transmitting the electrical energy storage capacity on the smart grid of the user to a predetermined terminal of the user.

15. The information processing apparatus according to claim 1, wherein the smart grid is electrically connected to at least one electrical energy storage device, and the information processing apparatus is further configured to execute the second recording process of recording, of an electrical energy storage capacity on the smart grid of the at least one electrical energy storage device electrically connected to the smart grid, an allocated electrical energy storage capacity on the smart grid allocated to the user in association with the user.

16. The information processing apparatus according to claim 1, wherein the smart grid is connected to at least one electrical energy storage device, and the information processing apparatus is further configured to execute a process of setting a portion of an electrical energy storage capacity on the smart grid of the at least one electrical energy storage device connected to the smart grid to be available for sharing with the user connected to the smart grid.

* * * * *